United States Patent
Sakhnini et al.

(10) Patent No.: US 11,936,586 B2
(45) Date of Patent: Mar. 19, 2024

(54) ASYMMETRIC MESSAGE REPETITION

(71) Applicant: QUALCOMM Incorporated, San Diego, CA (US)

(72) Inventors: Iyab Issam Sakhnini, San Diego, CA (US); Tao Luo, San Diego, CA (US); Yan Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 279 days.

(21) Appl. No.: 17/444,493

(22) Filed: Aug. 5, 2021

(65) Prior Publication Data
US 2022/0045824 A1   Feb. 10, 2022

Related U.S. Application Data

(60) Provisional application No. 62/706,297, filed on Aug. 7, 2020.

(51) Int. Cl.
| | | |
|---|---|---|
| *H04B 7/06* | (2006.01) | |
| *H04L 1/08* | (2006.01) | |
| *H04L 5/00* | (2006.01) | |
| *H04W 72/23* | (2023.01) | |

(52) U.S. Cl.
CPC ............. *H04L 5/0053* (2013.01); *H04L 1/08* (2013.01); *H04W 72/23* (2023.01)

(58) Field of Classification Search
CPC ....... H04L 5/0053; H04L 1/08; H04L 5/0023; H04W 72/23; H04B 7/0695
See application file for complete search history.

(56) References Cited

U.S. PATENT DOCUMENTS

| | | | | |
|---|---|---|---|---|
| 11,357,028 | B2 * | 6/2022 | Zhou | H04W 72/1268 |
| 2019/0281652 | A1 * | 9/2019 | Zhang | H04W 76/25 |
| 2019/0394793 | A1 * | 12/2019 | Venugopal | H04L 1/1614 |
| 2020/0337029 | A1 * | 10/2020 | Yi | H04L 5/0053 |
| 2022/0201709 | A1 * | 6/2022 | Sun | H04L 5/0044 |
| 2022/0303910 | A1 * | 9/2022 | Zhang | H04L 5/0051 |
| 2022/0303918 | A1 * | 9/2022 | Sun | H04W 52/42 |
| 2022/0304023 | A1 * | 9/2022 | Zhang | H04L 5/0094 |
| 2022/0311564 | A1 * | 9/2022 | Sun | H04W 76/10 |
| 2022/0312458 | A1 * | 9/2022 | Sun | H04L 5/0091 |
| 2022/0312485 | A1 * | 9/2022 | Zhang | H04L 5/0073 |
| 2023/0041109 | A1 * | 2/2023 | Ling | H04L 5/0023 |

FOREIGN PATENT DOCUMENTS

| | | | | |
|---|---|---|---|---|
| EP | 3955677 | A1 * | 2/2022 | ............ H04L 1/189 |
| WO | WO-2021168709 | A1 * | 9/2021 | |

OTHER PUBLICATIONS

3GPP TSG RAN meeting #79, R1-145457 Title: LS on clarification of UE category with supported spatial layers (Year: 2014).*

\* cited by examiner

*Primary Examiner* — Diane L Lo
*Assistant Examiner* — Abusayeed M Haque
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may determine an asymmetric sequence of transmission configuration indicator (TCI) states for repeating a message or an asymmetric sequence of spatial relations for repeating the message. The UE may repeat the message according to the asymmetric sequence of TCI states or spatial relations. Numerous other aspects are provided.

30 Claims, 6 Drawing Sheets

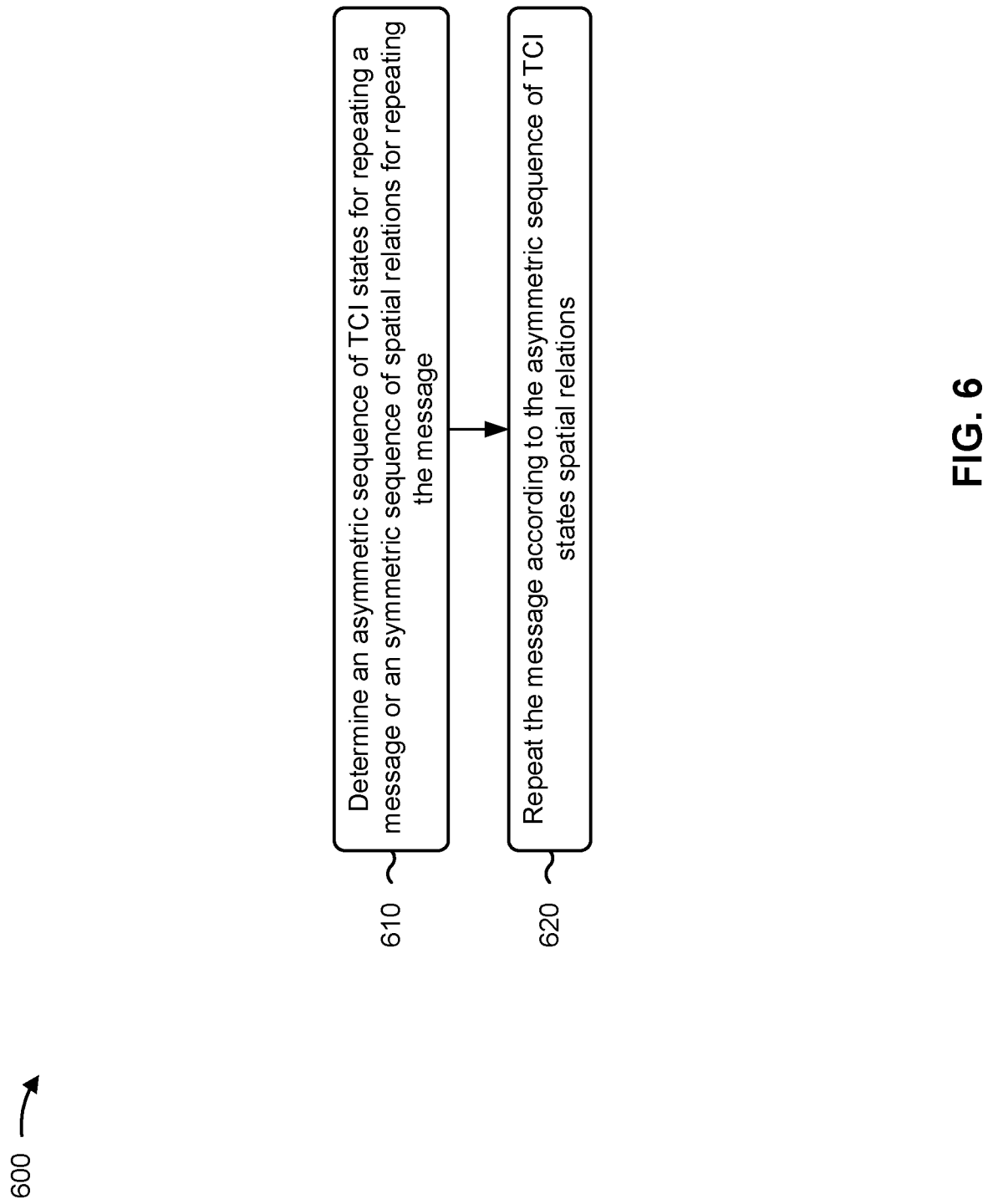

ASYMMETRIC MESSAGE REPETITION

CROSS-REFERENCE TO RELATED APPLICATION

This patent application claims priority to U.S. Provisional Patent Application No. 62/706,297, filed on Aug. 7, 2020, entitled "ASYMMETRIC MESSAGE REPETITION ACROSS TRANSMISSION AND RECEPTION POINTS," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for asymmetric message repetition across transmission and reception points.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" or "forward link" refers to the communication link from the BS to the UE, and "uplink" or "reverse link" refers to the communication link from the UE to the BS. As will be described in more detail herein, a BS may be referred to as a Node B, a gNB, an access point (AP), a radio head, a transmit receive point (TRP), a New Radio (NR) BS, or a 5G Node B.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE, NR, and other radio access technologies.

SUMMARY

In some aspects, a method of wireless communication performed by a user equipment (UE) includes determining an asymmetric sequence of transmission configuration indicator (TCI) states for repeating a message or an asymmetric sequence of spatial relations for repeating the message, and repeating the message according to the asymmetric sequence of TCI states or spatial relations.

In some aspects, a method of wireless communication performed by a base station includes determining an asymmetric sequence of TCI states for repeating a message or an asymmetric sequence of spatial relations for repeating the message, and repeating the message according to the asymmetric sequence of TCI states spatial relations.

In some aspects, a UE for wireless communication includes a memory and one or more processors coupled to the memory, the one or more processors configured to determine an asymmetric sequence of TCI states for repeating a message or an asymmetric sequence of spatial relations for repeating the message, and repeat the message according to the asymmetric sequence of TCI states or spatial relations.

In some aspects, a base station for wireless communication includes a memory; and one or more processors coupled to the memory, the one or more processors configured to determine an asymmetric sequence of TCI states for repeating a message or an asymmetric sequence of spatial relations for repeating the message, and repeat the message according to the asymmetric sequence of TCI states spatial relations.

In some aspects, a non-transitory computer-readable medium storing a set of instructions for wireless communication includes one or more instructions that, when executed by one or more processors of a UE, cause the UE to determine an asymmetric sequence of TCI states for repeating a message or an asymmetric sequence of spatial relations for repeating the message, and repeat the message according to the asymmetric sequence of TCI states or spatial relations.

In some aspects, a non-transitory computer-readable medium storing a set of instructions for wireless communication includes one or more instructions that, when executed by one or more processors of a base station, cause the base station to determine an asymmetric sequence of TCI states for repeating a message or an asymmetric sequence spatial relations for repeating the message, and repeat the message according to the asymmetric sequence of TCI states spatial relations.

In some aspects, an apparatus for wireless communication includes means for determining an asymmetric sequence of TCI states for repeating a message or an asymmetric sequence of spatial relations for repeating the message, and means for repeating the message according to the asymmetric sequence of TCI states or spatial relations.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 6 is a diagram illustrating an example process performed, for example, by a base station, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
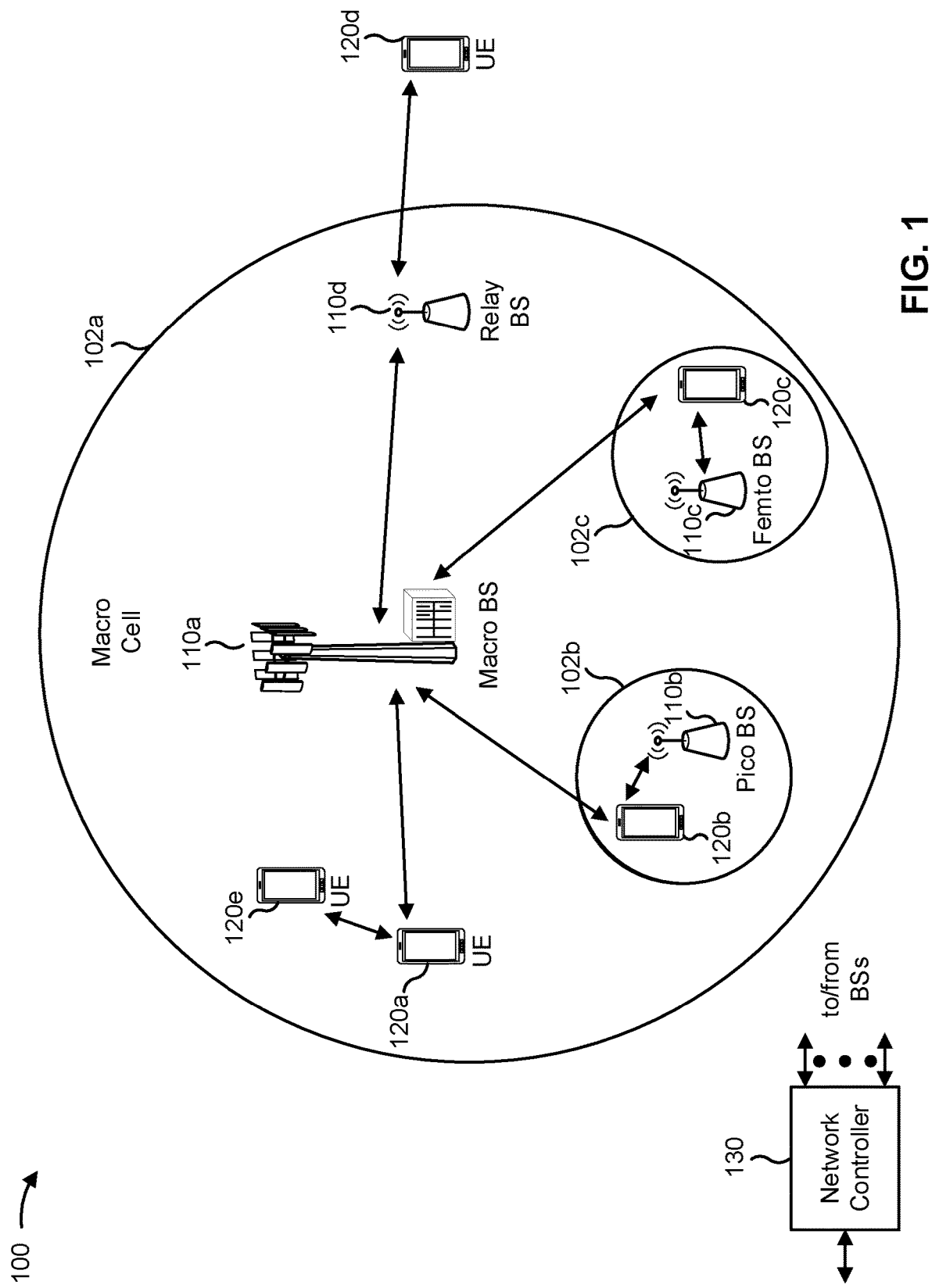
FIG. 1 is a diagram illustrating an example of a wireless network, in accordance with the present disclosure.

FIG. 1 is a diagram illustrating an example of a wireless network 100 in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, or a transmit receive point (TRP). Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, or a virtual network using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG.

1, a relay BS 110d may communicate with macro BS 110a and a UE 120d in order to facilitate communication between BS 110a and UE 120d. A relay BS may also be referred to as a relay station, a relay base station, or a relay.

Wireless network 100 may be a heterogeneous network that includes BSs of different types, such as macro BSs, pico BSs, femto BSs, and/or relay BSs. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, and/or an air interface. A frequency may also be referred to as a carrier, and/or a frequency channel. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
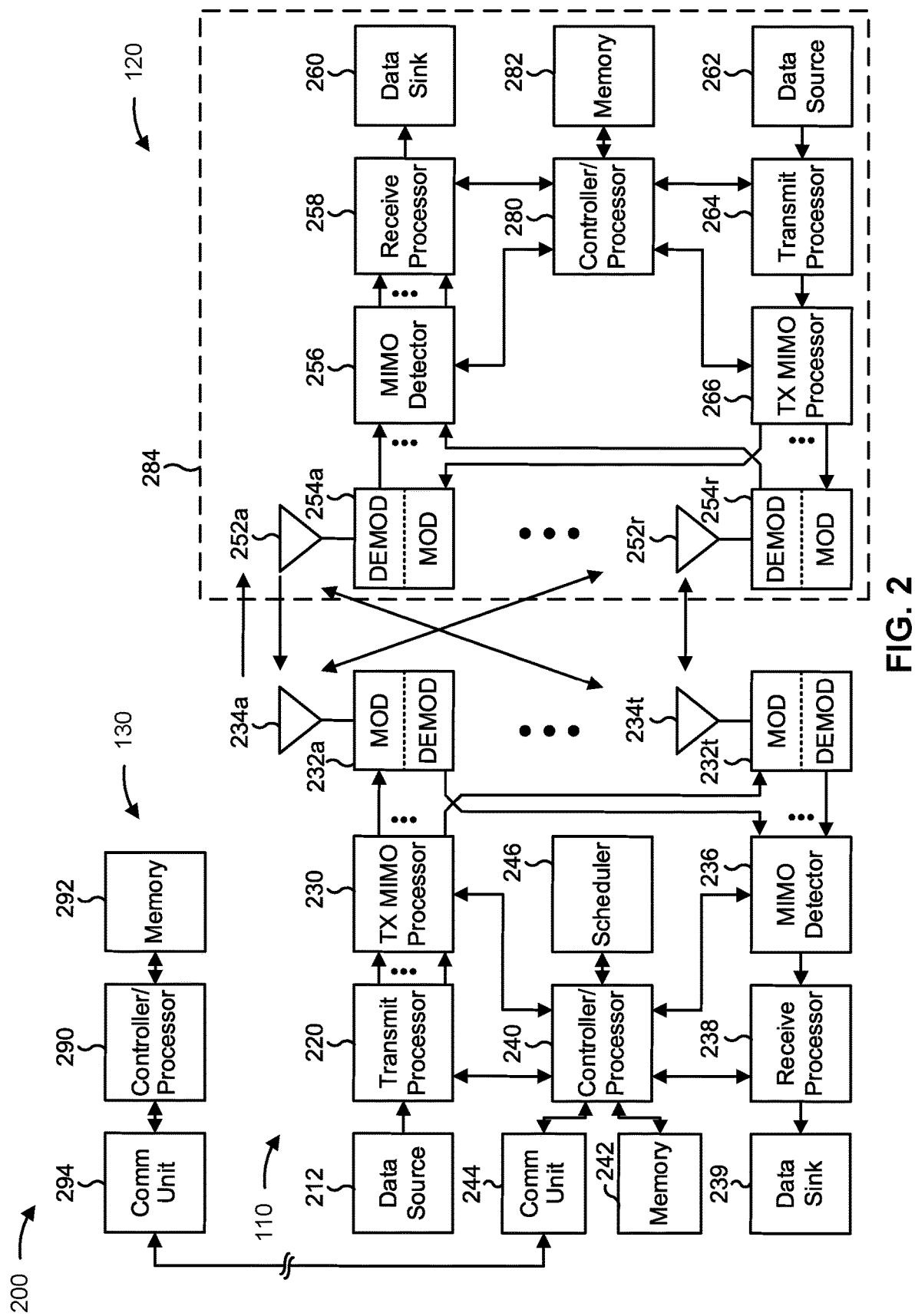
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, upper layer signaling) and provide overhead symbols and control symbols. Transmit processor 220 may also generate reference symbols for reference signals (e.g., a cell-specific reference signal (CRS), a demodulation reference signal (DMRS)) and synchronization signals (e.g., the primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), and/or CQI, among other examples. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 4-6).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 4-6).

Controller/processor 240 of base station 110, controller/processor 280 of UE 120, and/or any other component(s) of FIG. 2 may perform one or more techniques associated with asymmetric message repetition across TRPs, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of base station 110 and/or UE 120, may cause the one or more processors, UE 120, and/or base station 110 to perform or direct operations of, for example, process 500 of FIG. 5, process 600 of FIG. 6, and/or other processes as described herein. In some aspects, executing instructions may include running the instructions, converting the instructions, compiling the instructions, and/or interpreting the instructions, among other examples.

In some aspects, UE 120 may include means for determining an asymmetric sequence of transmission configuration indicator (TCI) states for repeating a message or an asymmetric sequence of spatial relations for repeating the message (e.g., using controller/processor 280, memory 282, and/or the like), and/or means for repeating the message according to the asymmetric sequence of TCI states or spatial relations (e.g., using controller/processor 280, DEMOD 254, MIMO detector 256, receive processor 258, transmit processor 264, TX MIMO processor 266, MOD 254, antenna 252, memory 282). In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, and/or receive processor 258.

In some aspects, base station 110 may include means for determining an asymmetric sequence of TCI states for repeating a message or an asymmetric sequence of spatial relations for repeating the message (e.g., using controller/processor 240, memory 242), and/or means for repeating the message according to the asymmetric sequence of TCI states spatial relations message (e.g., using controller/processor 240, transmit processor 220, TX MIMO processor 230, MOD 232, DEMOD 232, MIMO detector 236, receive processor 238, antenna 234, memory 242). In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, and/or antenna 234.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
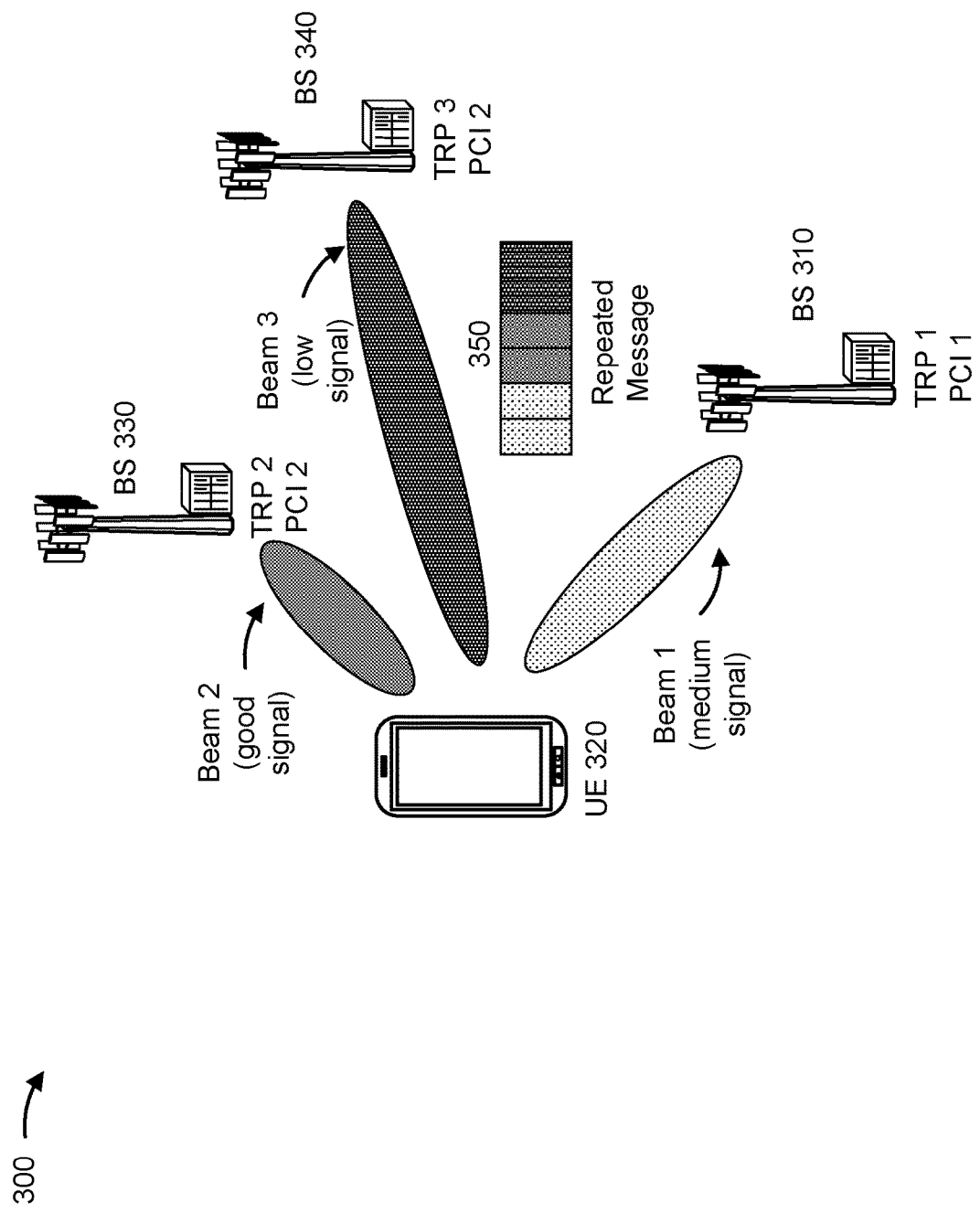
FIG. 3 is a diagram illustrating an example of symmetric message repetition across transmit and receive points (TRPs), in accordance the present disclosure.

FIG. 3 is a diagram illustrating an example 300 of symmetric message repetition across TRPs, in accordance with the present disclosure. As shown in FIG. 3, example 300 includes communication between BS 310 (TRP 1), BS 330 (TRP 2) and BS 340 (TRP 3) (e.g., a BS 110 depicted in FIGS. 1 and 2) and a UE 320 (e.g., a UE 120 depicted in FIGS. 1 and 2). In some aspects, UE 320 may be a reduced capability (RedCap) device that operates with less power, fewer antennas, lower complexity, fewer features, and/or less UE capability than full featured or enhanced mobile broadband UEs. In some aspects, BS 310, BS 330, BS 340, and UE 320 may be included in a wireless network, such as wireless network 100. BS 310 and UE 320 may communicate on a wireless access link with a first beam (Beam 1 in FIG. 3), which may include an uplink and/or a downlink. BS 330 and UE 320 may communicate on a wireless access link with a second beam (Beam 2 in FIG. 3), which may include an uplink and/or a downlink. BS 340 and UE 320 may communicate on a wireless access link with a third beam (Beam 3), which may include an uplink and/or a downlink.

Beamforming includes generation of a beam using multiple signals on different antenna elements, where one or more or all of the multiple signals are shifted in phase relative to each other. The formed beam may carry physical or higher layer reference signals or information. As each signal of the multiple signals is radiated from a respective antenna element, the radiated signals interact, interfere (constructive and destructive interference), and amplify each other to form a resulting beam. The shape (such as the amplitude, width, and/or presence of side lobes) and the direction (such as an angle of the beam relative to a surface of an antenna array) can be dynamically controlled by modifying the phase shifts or phase offsets imparted by the phase shifters and amplitudes imparted by the amplifiers of the multiple signals relative to each other. Each TRP may transmit (or receive) a message on a beam according to a certain beam configuration, or TCI state. UE 320 may transmit (or receive) a message on a beam according to a certain beam configuration, or spatial relation. A spatial relation may be identified by a spatial relation indicator (SRI).

To enhance coverage for wireless communications, a message may be repeated multiple times such that there are multiple repetitions (occasions) of the same message. Example 300 shows UE 320 receiving the same message (e.g., transport block) on Beam 1 from TRP 1, Beam 2 from TRP 2, and Beam 3 from TRP 3. For example, TRP 1 may transmit on Beam 1 with a first TCI state (TCI 1), TRP 2 may transmit on Beam 2 with a second TCI state (TCI 2), and TRP 3 may transmit on Beam 3 with a third TCI state (TCI 3). Alternatively, example 300 may appear to show UE 320 transmitting the same message on Beam 1 (with SRI 1), Beam 2 (with SRI 2), and Beam 3 (with SRI 3).

For example, UE 320 may receive two repetitions of the same message on a physical downlink shared channel (PDSCH) by frequency division multiplexing or time division multiplexing. Example 300 shows two repetitions from each beam, or TCI state, in a symmetrical sequence 350. Symmetrical sequence 350 is symmetrical because a quantity of repetitions is the same for each TCI state. Example 300 shows symmetrical sequence 350 of {TCI 1, TCI 1, TCI 2, TCI 2, TCI 3, TCI 3}. That is, a message is transmitted twice by each TRP. Each repetition may be limited to a 2-layer multiple-input-multiple-out (MIMO) transmission.

In reality, channel conditions for each beam may differ. Some TRPs may be further away, and some beams may suffer interference or blockage. For example, example 300 shows that Beam 1 is a medium signal, Beam 2 is a good signal, and Beam 3 is a low signal (TRP 3 is further away). However, each TRP repeats a message the same quantity of times even though the channel conditions for each beam is different. If a strong beam (Beam 2) only needs one repetition of a message, the TRP and UE 320 may waste time, power, processing resources, and signaling resources with a second repetition. If a beam (Beam 3) is weak, two repetitions of a message may not be enough for UE 320 to ensure that a message is successfully received. The TRP and UE 320 may waste time, power, processing resources, and signaling resources retransmitting a message or otherwise accounting for degraded communications.

As indicated above, FIG. 3 is provided as an example. Other examples may differ from what is described with regard to FIG. 3.

Figure 4:
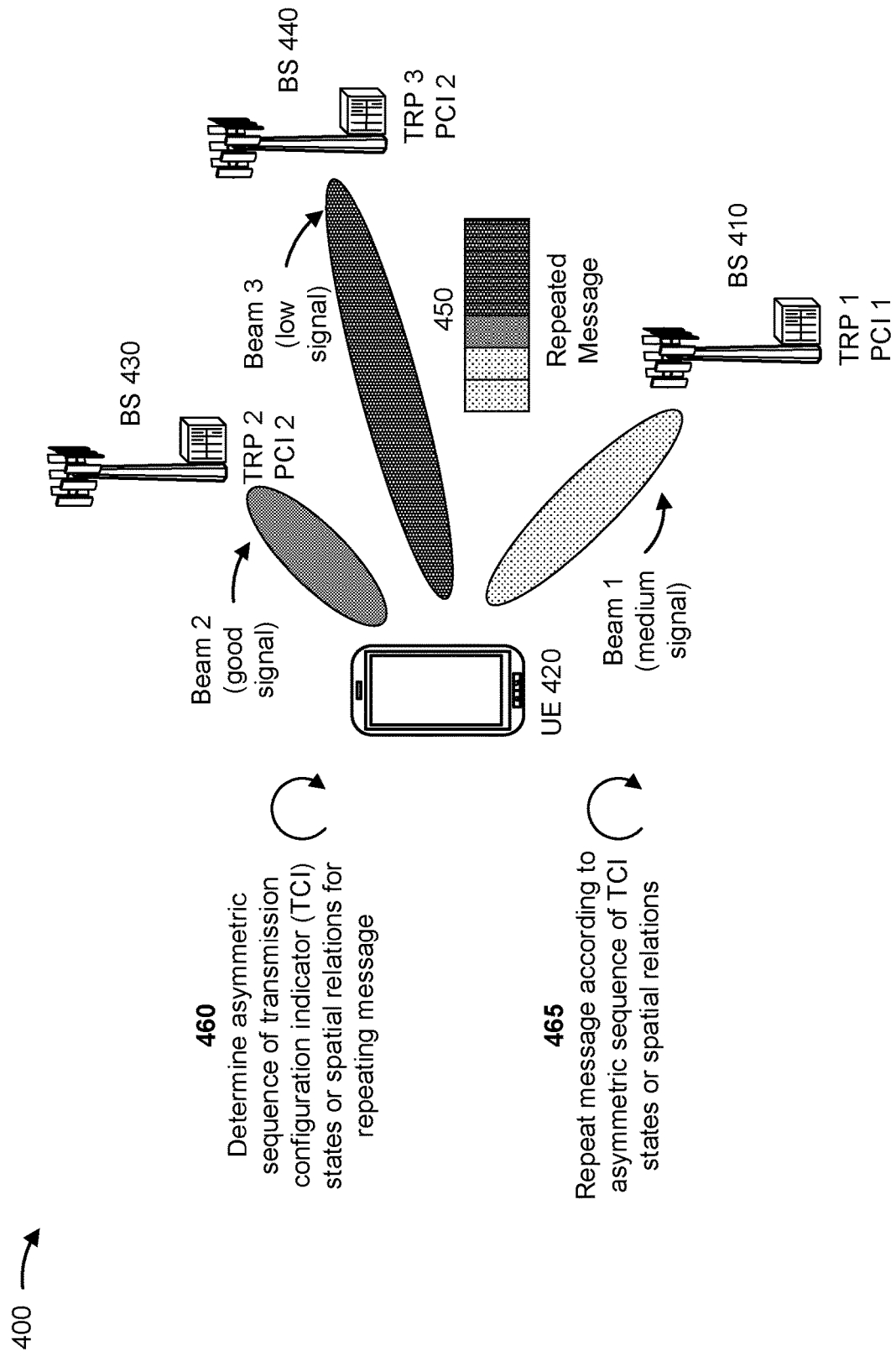
FIG. 4 is a diagram illustrating an example of asymmetric message repetition across TRPs, in accordance with the present disclosure.

FIG. 4 is a diagram illustrating an example 400 of asymmetric message repetition across TRPs, in accordance with the present disclosure. As shown in FIG. 4, example 400 includes communication between BS 410 (TRP 1), BS 430 (TRP 2) and BS 440 (TRP 3) (e.g., a BS 110 depicted in FIGS. 1 and 2) and a UE 420 (e.g., a UE 120 depicted in FIGS. 1 and 2), similar to as shown in connection with FIG. 3.

According to various aspects described herein, a UE or TRP may determine an asymmetric sequence of TCI states for repeating a message or an asymmetric sequence of spatial relations for repeating the message. A sequence may be asymmetric if a quantity of repetitions differs between TCI states or spatial relations. For example, an asymmetric sequence of TCI states for the same message may be {TCI 1, TCI 1, TCI 2, TCI 3, TCI 3, TCI 3}, rather than a symmetric sequence of {TCI 1, TCI 1, TCI 2, TCI 2, TCI 3, TCI 3}. An asymmetric sequence of spatial relations may be {SRI 1, SRI 1, SRI 2, SRI 3, SRI 3, SRI 3}, rather than a symmetric sequence of {SRI 1, SRI 1, SRI 2, SRI 2, SRI 3, SRI 3}. Note that a single transmission of a message in a sequence, such as TCI 2 or SRI 2 in the examples, is still referred to as a "repetition" for purposes of explanation. As such, a sequence may be called asymmetric if the sequence includes repetitions of a plurality of TCI states or a plurality of spatial relations, where a number of repetitions of at least one of the plurality of TCI states (or plurality of spatial relations) is different than a number of repetitions of another of the plurality of TCI states (or plurality of spatial relations). Therefore, in the example above, sequence {TCI 1, TCI 1, TCI 2, TCI 3, TCI 3, TCI 3} is asymmetric for multiple reasons. It is asymmetric as the number of repetitions of TCI 1 is different than the number of repetitions of TCI 2. Furthermore, it is asymmetric as the number of repetitions of TCI 1 is also different than the number of repetitions of TCI 3. Finally, it is further asymmetric as the number of repetitions of TCI 2 is different than the number of repetitions of TCI 3.

The UE or TRP may repeat a message according to the asymmetric sequence of TCI states or spatial relations. Repeating a message may include transmitting repetitions of a message or receiving repetitions of a message. The TRP may be a base station (e.g., gNB) that schedules transmissions or receptions for the UE, and thus the TRP may schedule messages for the UE according to the asymmetric sequence of TCI states or spatial relations, depending on whether repetitions of a message are to be received or transmitted. As a result, the UE and the TRP conserve time, power, processing resources, and signaling resources by not transmitting more repetitions than necessary and by not undergoing retransmission procedures due to degraded communications.

To be clear, the asymmetric aspect of an asymmetric sequence may apply to a single grouping of repetitions for a message and is not meant to count a repetition of another grouping of repetitions for the same message. For example, a first grouping of repetitions for a message via TCI 1 in a first sequence (sequence 1) with TCI 2 is {TCI 1, TCI 1, TCI 2, TCI 2}. If, for some reason, the same message for TCI 1 is transmitted again in a second grouping of repetitions right after sequence 1, the first repetition of TCI 1 in the second grouping of repetitions cannot be considered to be a third repetition of TCI 1 in sequence 1, such that a count is three repetitions for TCI 1 and two repetitions for TCI 2 in sequence 1. Three repetitions for TCI 1 and two repetitions for TCI 2 would be considered an asymmetric sequence, but in this example, the "third" repetition of TCI is in the second grouping and is considered to be part of a next sequence (sequence 2). As such, in this example, the first sequence above, (sequence 1) {TCI 1, TCI 1, TCI 2, TCI 2}, remains a symmetric sequence because the additional repetition for TCI 1 is in the second grouping and is not part of sequence 1. As used herein, a transmission or reception of anything other than a TCI state or a spatial relation after transmission or reception of a sequence of TCI states is considered to be a second sequence or grouping of repetitions.

As shown in FIG. 4, and by reference number 460, UE 420 may determine an asymmetric sequence of TCI states for repeating a message or an asymmetric sequence of spatial relations for repeating the message. UE 420 may determine the asymmetric sequence based at least in part on measurements of channel conditions, interference, beam blockage, signal strengths, and/or signal qualities. A stronger beam may have fewer repetitions in the asymmetric sequence than a weaker beam. Example 400 shows an asymmetric sequence 450 of {TCI 1, TCI 1, TCI 2, TCI 3, TCI 3, TCI 3} or {SRI 1, SRI 1, SRI 2, SRI 3, SRI 3, SRI 3} for repetitions of a message that UE 420 may receive from TRP 1, TRP 2, and TRP 3. Each repetition (TCI state) in an asymmetric sequence is a copy of the same message in the other repetitions. Note that there is only one repetition with TCI 2/SRI 2, while there are three repetitions with TCI 3/SRI 3.

In some aspects, UE 420 may transmit, to a base station that schedules communication for UE 420, an indication of a recommendation that is based at least in part on asymmetric sequence 450. UE 420 may receive scheduling that is based at least in part on the recommendation, and the scheduling may follow asymmetric sequence 450. In some aspects, the recommendation may include a recommended order of beam sweeping across different TRPs. The recommended order of beam sweeping may include completing repetition of the message on one antenna panel before starting repetition on another antenna panel.

Alternatively, the base station may determine an asymmetric sequence of TCI states or spatial relations based at least in part on conditions such as measurements of a channel, interference, beam blockage, signal strengths, and/or signal qualities. The base station may also determine (or redetermine) the asymmetric sequence after determining that such conditions have changed. The base station may transmit scheduling for the asymmetric sequence and repeat (transmit or receive) the message according to the asymmetric sequence. UE 420 may determine the asymmetric sequence from the scheduling, or some other indication from the base station.

As shown by reference number 465, UE 420 may repeat the message according to the asymmetric sequence of TCI states or spatial relations. In example, 400, repeating the message includes receiving repetitions of the message. In some aspects, the message be a downlink communication on a PDSCH, a downlink communication on a physical uplink control channel (PUCCH), and/or a reference signal Alternatively, example 400 may be used to show UE 420 may repeat a message by transmitting repetitions of the same message to TRP 1, TRP 2, and TRP 3. In some aspects, the message may be an uplink communication on a physical PDSCH, an uplink communication on a physical uplink shared channel (PUSCH), a reference signal (e.g., sounding reference signal (SRS)), and/or a reauthorization request.

Currently, message repetition is specified as two repetitions of a message on the PDSCH. That is, only a symmetric sequence is specified, and only for PDSCH. However, an asymmetric sequence, may be open to multiple possibilities. In some aspects, TCI states or spatial relations in an asymmetric sequence may be belong to beams for the same TRP. For example, a first TCI state of the TCI states or a first spatial relation of the spatial relations may correspond to a first beam for the TRP. A second TCI state of the TCI states or a second spatial relation of the spatial relations, different from the first TCI state or spatial relation, may correspond to a second beam, different than the first beam, for the TRP.

Alternatively, TCI states or spatial relations in an asymmetric sequence may belong to beams across different TRPs in the same cell (same physical cell identifier (PCI)). Example 400 shows that TRP 2 and TRP 3 have the same PCI (PCI 2). In some aspects, TCI states or spatial relations in an asymmetric sequence may be belong to beams across different TRPs with different PCIs. Example 400 shows that TRP 1 has a different PCI (PCI 1) than TRP 2 and TRP 3 (PCI 2).

Currently, message repetition is specified only for the same MIMO layer. In some aspects, at least two TCI states or spatial relations of an asymmetric sequence may correspond to different MIMO layers (L1 or L2) of a same TCI or spatial relation. For example, an asymmetric sequence may include {TCI 1 [L1/L2], TCI 1 [L1/L2], TCI 1 [L1], TCI 1 [L1], TCI 2 [L1], TCI 2 [L1]}

As pointed out above, current specifications define message repetition as two repetitions on the PDSCH for each TCI state, which is only for the same PCI and the same MIMO layer. Although there have been multiple coverage enhancements, including for reduced capacity devices, the specification of two repetitions on PDSCH for each TCI state remains. By contrast, various aspects described herein provide more flexibility for enhancing coverage using message repetition.

Figure 5:
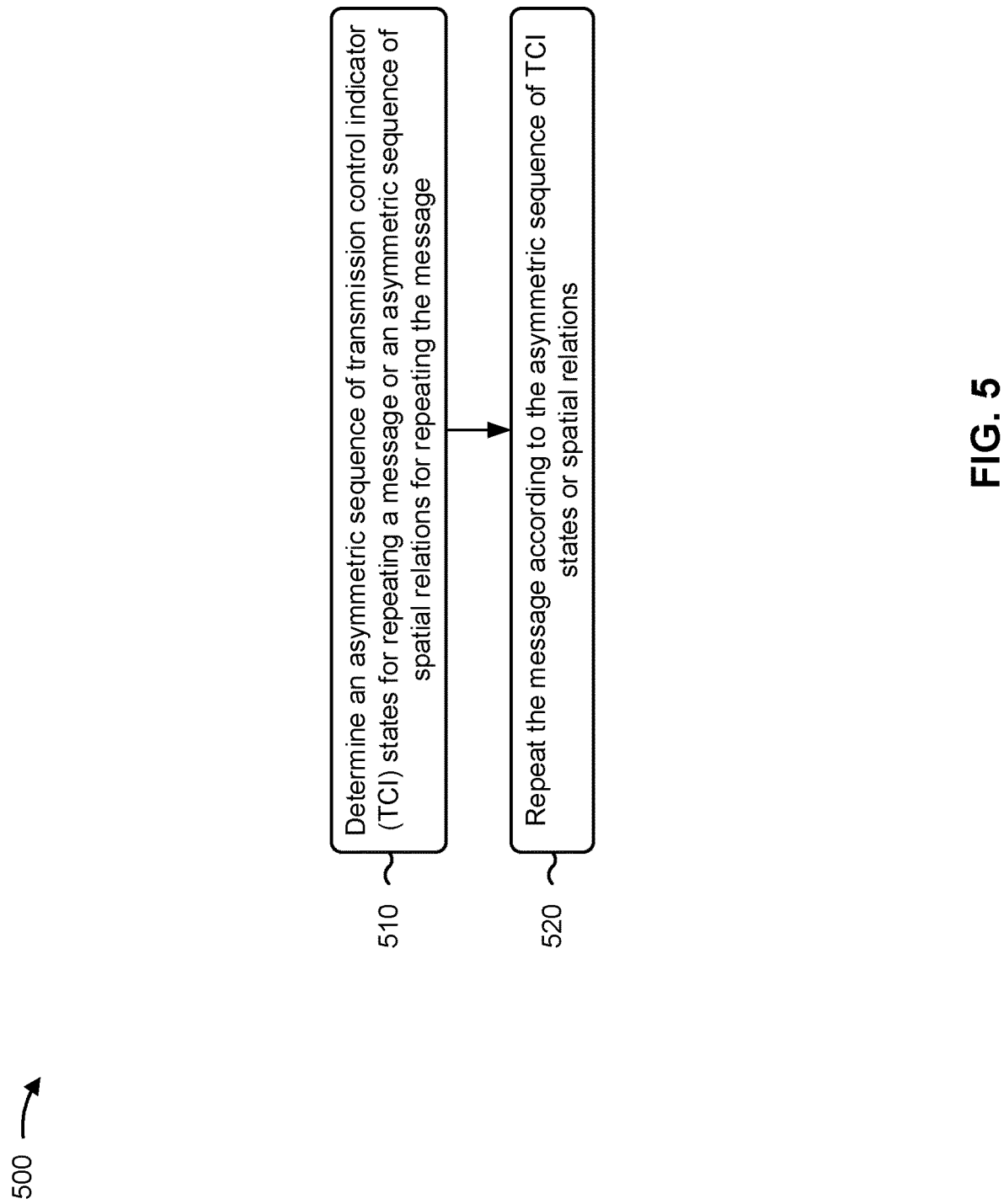
FIG. 5 is a diagram illustrating an example process performed, for example, by a UE, in accordance with the present disclosure.

FIG. 5 is a diagram illustrating an example process 500 performed, for example, by a UE, in accordance with the present disclosure. Example process 500 is an example where the UE (e.g., a UE 120 depicted in FIGS. 1 and 2, UE 420 depicted in FIG. 4) performs operations associated with asymmetric message repetition across TRPs.

As shown in FIG. 5, in some aspects, process 500 may include determining an asymmetric sequence of TCI states for repeating a message or an asymmetric sequence of spatial relations for repeating the message (block 510). For example, the UE (e.g., using antenna 252, demodulator 254, MIMO detector 256, receive processor 258, transmit processor 264, TX MIMO processor 266, modulator 254, controller/processor 280, and/or memory 282) may determine an asymmetric sequence of TCI states for repeating a message or an asymmetric sequence of spatial relations for repeating the message, as described above, for example, with reference to FIG. 4.

As further shown in FIG. 5, in some aspects, process 500 may include repeating the message according to the asymmetric sequence of TCI states or spatial relations (block 520). For example, the UE (e.g., using antenna 252, demodulator 254, MIMO detector 256, receive processor 258, transmit processor 264, TX MIMO processor 266, modulator 254, controller/processor 280, and/or memory 282) may repeat the message according to the asymmetric sequence of TCI states or spatial relations, as described above, for example, with reference to FIG. 4.

Process 500 may include additional aspects, such as any single aspect or any combination of aspects described below and/or in connection with one or more other processes described elsewhere herein.

In a first aspect, repeating the message includes transmitting repetitions of the message on a physical uplink channel.

In a second aspect, alone or in combination with the first aspect, repeating the message includes receiving repetitions of the message on a physical downlink channel.

In a third aspect, alone or in combination with one or more of the first and second aspects, process 500 includes transmitting an indication of the asymmetric sequence of TCI states or spatial relations to a base station, and receiving, based at least in part on transmitting the indication, scheduling for repeating the message.

In a fourth aspect, alone or in combination with one or more of the first through third aspects, the indication includes a recommended order of beam sweeping across different TRPs, and repeating the message includes repeating the message based at least in part on the recommended order of beam sweeping.

In a fifth aspect, alone or in combination with one or more of the first through fourth aspects, the recommended order of beam sweeping includes completing repetition of the message on one antenna panel before starting repetition on another antenna panel.

In a sixth aspect, alone or in combination with one or more of the first through fifth aspects, the message is one of an SRS, a paging message, or a reauthorization request.

In a seventh aspect, alone or in combination with one or more of the first through sixth aspects, a first TCI state of the TCI states or a first spatial relation of the spatial relations corresponds to a first beam for a TRP, and a second TCI state of the TCI states or a second spatial relation of the spatial relations, different from the first TCI state or spatial relation, corresponds to a second beam, different than the first beam, for the TRP.

In an eighth aspect, alone or in combination with one or more of the first through seventh aspects, the TCI states or spatial relations correspond to beams for different TRPs with a same PCI.

In a ninth aspect, alone or in combination with one or more of the first through eighth aspects, the TCI states or spatial relations correspond to beams for different TRPs with different PCIs.

In a tenth aspect, alone or in combination with one or more of the first through ninth aspects, at least two TCI states or spatial relations of the asymmetric sequence correspond to different multiple input multiple output layers of a same TCI or spatial relation.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a diagram illustrating an example process 600 performed, for example, by a base station, in accordance with the present disclosure. Example process 600 is an example where the base station (e.g., base station 110 depicted in FIGS. 1 and 2, BS 410, 430, and 440 depicted in FIG. 4) performs operations associated with asymmetric message repetition across TRPs.

As shown in FIG. 6, in some aspects, process 600 may include determining an asymmetric sequence of TCI states for repeating a message or an asymmetric sequence of spatial relations for repeating the message (block 610). For example, the base station (e.g., using transmit processor 220, TX MIMO processor 230, modulator 232, antenna 234, demodulator 232, MIMO detector 236, receive processor 238, controller/processor 240, memory 242, and/or scheduler 246) may determine an asymmetric sequence of TCI states for repeating a message or an asymmetric sequence of spatial relations for repeating the message, as described above, for example, with reference to FIG. 4.

As further shown in FIG. 6, in some aspects, process 600 may include repeating the message according to the asymmetric sequence of TCI states spatial relations (block 620). For example, the base station (e.g., using transmit processor 220, TX MIMO processor 230, modulator 232, antenna 234, demodulator 232, MIMO detector 236, receive processor 238, controller/processor 240, memory 242, and/or scheduler 246) may repeat the message according to the asymmetric sequence of TCI states spatial relations, as described above, for example, with reference to FIG. 4.

Process 600 may include additional aspects, such as any single aspect or any combination of aspects described below and/or in connection with one or more other processes described elsewhere herein.

In a first aspect, repeating the message includes transmitting repetitions of the message on a physical downlink channel.

In a second aspect, alone or in combination with the first aspect, repeating the message includes receiving repetitions of the message on a physical uplink channel.

In a third aspect, alone or in combination with one or more of the first and second aspects, process 600 includes scheduling a UE for repeating the message according to the asymmetric sequence of TCI states or spatial relations.

In a fourth aspect, alone or in combination with one or more of the first through third aspects, determining the asymmetric sequence of TCI states or spatial relations includes determining the asymmetric sequence of TCI states or spatial relations based at least in part on an indication, received from a UE, that includes a recommended asymmetric sequence of TCI states or spatial relations.

In a fifth aspect, alone or in combination with one or more of the first through fourth aspects, the indication includes a recommended order of beam sweeping across different TRPs, and repeating the message includes repeating the message based at least in part on the recommended order of beam sweeping.

In a sixth aspect, alone or in combination with one or more of the first through fifth aspects, the recommended order of beam sweeping includes completing repetition of the message on one antenna panel before starting repetition on another antenna panel.

In a seventh aspect, alone or in combination with one or more of the first through sixth aspects, the message is one of an SRS, a paging message, or a reauthorization request.

In an eighth aspect, alone or in combination with one or more of the first through seventh aspects, a first TCI state of the TCI states or a first spatial relation of the spatial relations corresponds to a first beam for a TRP, and a second TCI state of the TCI states or a second spatial relation of the spatial relations, different from the first TCI state or spatial relation, corresponds to a second beam, different than the first beam, for the TRP.

In a ninth aspect, alone or in combination with one or more of the first through eighth aspects, the TCI states or spatial relations correspond to beams for different TRPs with a same PCI.

In a tenth aspect, alone or in combination with one or more of the first through ninth aspects, the TCI states or spatial relations correspond to beams for different TRPs with different PCIs.

In an eleventh aspect, alone or in combination with one or more of the first through tenth aspects, at least two TCI states or spatial relations of the asymmetric sequence correspond to different multiple input multiple output layers of a same TCI or spatial relation.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The following provides an overview of some Aspects of the present disclosure:

Aspect 1: A method of wireless communication performed by a user equipment (UE), comprising: determining an asymmetric sequence of transmission configuration indicator (TCI) states for repeating a message or an asymmetric sequence of spatial relations for repeating the message; and repeating the message according to the asymmetric sequence of TCI states or spatial relations.

Aspect 2: The method of Aspect 1, wherein repeating the message includes transmitting repetitions of the message on a physical uplink channel.

Aspect 3: The method of Aspect 1, wherein repeating the message includes receiving repetitions of the message on a physical downlink channel.

Aspect 4: The method of any of Aspects 1-3, further comprising: transmitting an indication of the asymmetric sequence of TCI states or spatial relations to a base station; and receiving, based at least in part on transmitting the indication, scheduling for repeating the message.

Aspect 5: The method of Aspect 4, wherein the indication includes a recommended order of beam sweeping across different transmission and reception points, and wherein repeating the message includes repeating the message based at least in part on the recommended order of beam sweeping.

Aspect 6: The method of Aspect 5, wherein the recommended order of beam sweeping includes completing repetition of the message on one antenna panel before starting repetition on another antenna panel.

Aspect 7: The method of any of Aspects 1-6, wherein the message is one of a sounding reference signal, a paging message, or a reauthorization request.

Aspect 8: The method of any of Aspects 1-7, wherein a first TCI state of the TCI states or a first spatial relation of the spatial relations corresponds to a first beam for a transmission and reception point (TRP), and a second TCI state of the TCI states or a second spatial relation of the spatial relations, different from the first TCI state or spatial relation, corresponds to a second beam, different than the first beam, for the TRP.

Aspect 9: The method of any of Aspects 1-8, wherein the TCI states or spatial relations correspond to beams for different transmission and reception points with a same physical cell identifier.

Aspect 10: The method of any of Aspects 1-8, wherein the TCI states or spatial relations correspond to beams for different transmission and reception points with different physical cell identifiers.

Aspect 11: The method of any of Aspects 1-10, wherein at least two TCI states or spatial relations of the asymmetric sequence correspond to different multiple input multiple output layers of a same TCI or spatial relation.

Aspect 12: A method of wireless communication performed by a base station, comprising: determining an asymmetric sequence of transmission configuration indicator (TCI) states for repeating a message or an asymmetric sequence of spatial relations for repeating the message; and repeating the message according to the asymmetric sequence of TCI states or spatial relations.

Aspect 13: The method of Aspect 12, wherein repeating the message includes transmitting repetitions of the message on a physical downlink channel.

Aspect 14: The method of Aspect 12, wherein repeating the message includes receiving repetitions of the message on a physical uplink channel.

Aspect 15: The method of any of Aspect 12-14, further comprising scheduling a user equipment (UE) for repeating the message according to the asymmetric sequence of TCI states or spatial relations.

Aspect 16: The method of any of Aspect 12-15, wherein determining the asymmetric sequence of TCI states or spatial relations includes determining the asymmetric sequence of TCI states or spatial relations based at least in part on an indication, received from a user equipment (UE), that includes a recommended asymmetric sequence of TCI states or spatial relations.

Aspect 17: The method of Aspect 16, wherein the indication includes a recommended order of beam sweeping across different transmission and reception points, and wherein repeating the message includes repeating the message based at least in part on the recommended order of beam sweeping.

Aspect 18: The method of Aspect 17, wherein the recommended order of beam sweeping includes completing repetition of the message on one antenna panel before starting repetition on another antenna panel.

Aspect 19: The method of any of Aspect 12-18, wherein the message is one of a sounding reference signal, a paging message, or a reauthorization request.

Aspect 20: The method of any of Aspect 12-19, wherein a first TCI state of the TCI states or a first spatial relation of the spatial relations corresponds to a first beam for a transmission and reception point (TRP), and a second TCI state of the TCI states or a second spatial relation of the spatial relations, different from the first TCI state or spatial relation, corresponds to a second beam, different than the first beam, for the TRP.

Aspect 21: The method of any of Aspect 12-20, wherein the TCI states or spatial relations correspond to beams for different transmission and reception points with a same physical cell identifier.

Aspect 22: The method of any of Aspect 12-20, wherein the TCI states or spatial relations correspond to beams for different transmission and reception points with different physical cell identifiers.

Aspect 23: The method of any of Aspect 12-22, wherein at least two TCI states or spatial relations of the asymmetric sequence correspond to different multiple input multiple output layers of a same TCI or spatial relation.

Aspect 24: An apparatus for wireless communication at a device, comprising a processor; memory coupled with the processor; and instructions stored in the memory and executable by the processor to cause the apparatus to perform the method of one or more of Aspects 1-23.

Aspect 25: A device for wireless communication, comprising a memory and one or more processors coupled to the memory, the one or more processors configured to perform the method of one or more of Aspects 1-23.

Aspect 26: An apparatus for wireless communication, comprising at least one means for performing the method of one or more of Aspects 1-23.

Aspect 27: A non-transitory computer-readable medium storing code for wireless communication, the code comprising instructions executable by a processor to perform the method of one or more of Aspects 1-23.

Aspect 28: A non-transitory computer-readable medium storing a set of instructions for wireless communication, the set of instructions comprising one or more instructions that, when executed by one or more processors of a device, cause the device to perform the method of one or more of Aspects 1-23.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware, firmware, and/or a combination of hardware and software.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:

determining an asymmetric sequence of transmission configuration indicator (TCI) states for repeating a message or an asymmetric sequence of spatial relations for repeating the message, the asymmetric sequence including a different number of repetitions of a plurality of the TCI states or spatial relations; and repeating the message according to the asymmetric sequence of TCI states or spatial relations.

2. The method of claim 1, wherein repeating the message includes transmitting repetitions of the message on a physical uplink channel.

3. The method of claim 1, wherein repeating the message includes receiving repetitions of the message on a physical downlink channel.

4. The method of claim 1, further comprising:
transmitting an indication of the asymmetric sequence of TCI states or spatial relations to a base station; and
receiving, based at least in part on transmitting the indication, scheduling for repeating the message.

5. The method of claim 4, wherein the indication includes a recommended order of beam sweeping across different transmission and reception points, and wherein repeating the message includes repeating the message based at least in part on the recommended order of beam sweeping.

6. The method of claim 5, wherein the recommended order of beam sweeping includes completing repetition of the message on one antenna panel before starting repetition on another antenna panel.

7. The method of claim 1, wherein the message is one of a sounding reference signal, a paging message, or a reauthorization request.

8. The method of claim 1, wherein a first TCI state of the TCI states or a first spatial relation of the spatial relations corresponds to a first beam for a transmission and reception point (TRP), and a second TCI state of the TCI states or a second spatial relation of the spatial relations, different from the first TCI state or spatial relation, corresponds to a second beam, different than the first beam, for the TRP.

9. The method of claim 1, wherein the TCI states or spatial relations correspond to beams for different transmission and reception points with a same physical cell identifier.

10. The method of claim 1, wherein the TCI states or spatial relations correspond to beams for different transmission and reception points with different physical cell identifiers.

11. The method of claim 1, wherein at least two TCI states or spatial relations of the asymmetric sequence correspond to different multiple input multiple output layers of a same TCI or spatial relation.

12. A method of wireless communication performed by a base station, comprising:
determining an asymmetric sequence of transmission configuration indicator (TCI) states for repeating a message or an asymmetric sequence of spatial relations for repeating the message, the asymmetric sequence including a different number of repetitions of a plurality of the TCI states or spatial relations; and
repeating the message according to the asymmetric sequence of TCI states or spatial relations.

13. The method of claim 12, wherein repeating the message includes transmitting repetitions of the message on a physical downlink channel.

14. The method of claim 12, wherein repeating the message includes receiving repetitions of the message on a physical uplink channel.

15. The method of claim 12, further comprising scheduling a user equipment (UE) for repeating the message according to the asymmetric sequence of TCI states or spatial relations.

16. The method of claim 12, wherein determining the asymmetric sequence of TCI states or spatial relations includes determining the asymmetric sequence of TCI states or spatial relations based at least in part on an indication, received from a user equipment (UE), that includes a recommended asymmetric sequence of TCI states or spatial relations.

17. The method of claim 16, wherein the indication includes a recommended order of beam sweeping across different transmission and reception points, and wherein repeating the message includes repeating the message based at least in part on the recommended order of beam sweeping.

18. The method of claim 17, wherein the recommended order of beam sweeping includes completing repetition of the message on one antenna panel before starting repetition on another antenna panel.

19. The method of claim 12, wherein the message is one of a sounding reference signal, a paging message, or a reauthorization request.

20. The method of claim 12, wherein a first TCI state of the TCI states or a first spatial relation of the spatial relations corresponds to a first beam for a transmission and reception point (TRP), and a second TCI state of the TCI states or a second spatial relation of the spatial relations, different from the first TCI state or spatial relation, corresponds to a second beam, different than the first beam, for the TRP.

21. The method of claim 12, wherein the TCI states or spatial relations correspond to beams for different transmission and reception points with a same physical cell identifier.

22. The method of claim 12, wherein the TCI states or spatial relations correspond to beams for different transmission and reception points with different physical cell identifiers.

23. The method of claim 12, wherein at least two TCI states or spatial relations of the asymmetric sequence correspond to different multiple input multiple output layers of a same TCI or spatial relation.

24. A user equipment (UE) for wireless communication, comprising:
a memory; and
one or more processors, coupled to the memory, configured to:
determine an asymmetric sequence of transmission configuration indicator (TCI) states for repeating a message or an asymmetric sequence of spatial relations for repeating the message, the asymmetric sequence including a different number of repetitions of a plurality of the TCI states or spatial relations; and
repeat the message according to the asymmetric sequence of TCI states or spatial relations.

25. The UE of claim 24, wherein the one or more processors are configured to:
transmit an indication of the asymmetric sequence of TCI states or spatial relations to a base station; and
receive, based at least in part on transmitting the indication, scheduling for repeating the message.

26. The UE of claim 25, wherein the indication includes a recommended order of beam sweeping across different transmission and reception points, and wherein the one or more processors, to repeat the message, are configured to repeat the message based at least in part on the recommended order of beam sweeping.

27. The UE of claim 24, wherein a first TCI state of the TCI states or a first spatial relation of the spatial relations corresponds to a first beam for a transmission and reception point (TRP), and a second TCI state of the TCI states or a second spatial relation of the spatial relations, different from the first TCI state or spatial relation, corresponds to a second beam, different than the first beam, for the TRP.

28. A base station for wireless communication, comprising:
   a memory; and
   one or more processors, coupled to the memory, configured to:
      determine an asymmetric sequence of transmission configuration indicator (TCI) states for repeating a message or an asymmetric sequence of spatial relations for repeating the message, the asymmetric sequence including a different number of repetitions of a plurality of the TCI states or spatial relations; and
      repeat the message according to the asymmetric sequence of TCI states or spatial relations.

29. The base station of claim 28, wherein the one or more processors are configured to schedule a user equipment (UE) for repeating the message according to the asymmetric sequence of TCI states or spatial relations.

30. The base station of claim 28, wherein the one or more processors, to determine the asymmetric sequence of TCI states or spatial relations, are configured to determine the asymmetric sequence of TCI states or spatial relations based at least in part on an indication, received from a user equipment (UE), that includes a recommended asymmetric sequence of TCI states or spatial relations.

\* \* \* \* \*